United States Patent [19]

Esser et al.

[11] Patent Number: 4,629,757

[45] Date of Patent: Dec. 16, 1986

[54] CATIONIC RUBBER LATICES, A PROCESS FOR THE PRODUCTION THEREOF AND THE USE THEREOF

[75] Inventors: Heinz Esser, Burscheid; Horst Krechlok, Leverkusen, both of Fed. Rep. of Germany

[73] Assignee: Bayer Aktiengesellschaft, Leverkusen, Fed. Rep. of Germany

[21] Appl. No.: 678,168

[22] Filed: Dec. 4, 1984

[30] Foreign Application Priority Data

Dec. 17, 1983 [DE] Fed. Rep. of Germany ....... 3345786

[51] Int. Cl.$^4$ ................................................ C08J 3/00
[52] U.S. Cl. ................................. 524/457; 106/277; 106/273 N

[58] Field of Search ................................ 524/834, 457; 106/273 N, 277

[56] References Cited

U.S. PATENT DOCUMENTS

| | | | |
|---|---|---|---|
| 3,549,579 | 12/1970 | Sinclair | 260/297 |
| 3,926,890 | 12/1975 | Huang et al. | 524/551 |
| 4,155,891 | 5/1979 | Pettelkau et al. | 524/217 |

*Primary Examiner*—Amelia B. Yarbrough
*Attorney, Agent, or Firm*—Connolly and Hutz

[57] ABSTRACT

Cationic latices produced by changing anionic latices using a cationic emulsifier exhibit good results when used for the improvement of cationic bitumen emulsions for surface treatment during road building, if an amphoteric emulsifier is added before addition of the cationic emulsifier.

1 Claim, No Drawings

CATIONIC RUBBER LATICES, A PROCESS FOR THE PRODUCTION THEREOF AND THE USE THEREOF

Catonic latices are used, among other things, for improving acidic resins, for the production of elastic concrete and mortar and principally for improving cationic bitumen emulsions for road building.

There are various methods of producing cationic rubber latices:

1. The latex is prepared by emulsion polymerisation using cationic emulsifiers or cationic comonomers (U.S. Pat. No. 4,305,860, DE-OS Nos. 2 008 643, 2 125 047, 2 549 883) or
2. An anionic latex is used as starting material and the anionic latex is changed into a cationic latex with particles having a positive electrical charge (U.S. Pat. No. 3,549,579; Ullmanns Enzyklopädie der technischen Chemie, Volume 13, 4th Edition, page 585).

According to the previously known processes, an anionic latex is converted into a cationic latex in several stages. In the first stage, the pH value of alkaline anionic latices is reduced by addition of dilute acid. This stage is unnecessary in the case of acidic anionic latices. Before the conversion is complete, a sufficient quantity of a non-ionic emulsifier is added to the latex in the second stage. Non-ionic emulsifiers have a stabilising effect both in an anionic and in a cationic medium and prevent the latex from precipitating as it passes the isoelectric point. After stabilisation of the latex further dilute acid and, at the same time, cationic emulsifier are added so that the conversion is completed.

The production of cationic latices by emulsion polymerisation (method 1) is frequently accompanied by technical problems. Moreover, such cationic latices often have an unsatisfactory improving effect in the case of cationic bitumen emulsions. If the method of exchange described above is selected for the production of cationic latices (method 2) problems frequently arise during subsequent processing because the desired rapid breaking behaviour in bitumen emulsions which are improved by an exchanged cationic latex is frequently impaired by the non-ionic emulsifier contained in the latex.

Cationic bitumen emulsions are used for road building, particularly for surface treatments, bitumen emulsions and stone chips being applied directly to the site in separate successive operations. With a simple surface treatment, the binder is sprayed uniformly over the substrate to be treated. The crude and pretreated stone chips (washed and coated with binder) are scattered on it and then rolled in. With this method, it is particularly important that the cationic bitumen emulsions in contact with the stone chips breaks as quickly as possible.

It has now been found that it is possible to provide a process for converting anionic latices into cationic latices using cationic emulsifiers, so that the latices remain stable even at the isoelectric point, and in which the latices are added to a cationic bitumen emulsion whose breaking behaviour is not adversely affected in contact with stone chips.

This is achieved by adding an amphoteric emulsifier to the anionic latex and then converting the anionic latex to a cationic latex using a cationic emulsifier.

Accordingly, the present invention provides a process for converting an anionic latex to a cationic latex by means of a cationic emulsifier, wherein an amphoteric emulsifier is added to the latex before addition of the cationic emulsifier.

Suitable amphoteric emulsifiers include, for example, ampholytes, betaines or amineoxides corresponding to the following formulae:

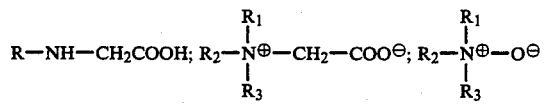

wherein R and at least one of the radicals $R_1$, $R_2$ and $R_3$ is a $C_8$-$C_{24}$ alkyl radical and the other radicals $R_1$, $R_2$ and $R_3$ are $C_1$-$C_4$ alkyl radicals.

Amphoteric emulsifiers are surface-active compounds capable of ionising in aqueous solution and giving the compound an anionic or cationic character depending on the conditions of the medium, i.e. they act as acids or bases depending on the pH value.

The cationic as well as the amphoteric emulsifiers are preferably used in quantities of 1 to 5% by weight, based on latex solid. Betaines having the above-mentioned formulae are preferred.

In particular, latices of carboxylated elastomers, preferably carboxylated polychloroprene have advantages when converted by the process according to the invention.

The invention also relates to the latices converted in this way which are characterized by the presence of a cationic and an amphoteric emulsifier, and to the use thereof for improving cationic bitumen emulsions.

The converted latices have pH values of 2 to 6, which are adjusted using acids, for example acetic acid, formic acid, oxalic acid, hydrochloric acid, sulphuric acid or phosphoric acid.

EXAMPLES

The aqueous solution of the amphoteric emulsifier is added to the latex provided and stirred. If necessary, an acidic pH value is adjusted by addition of dilute acid. This step is generally unnecessary with acidic latices, since the aqueous solution of the cationic emulsifier, which is acidified by the specified quantity of acid, is added immediately after addition of the amphoteric emulsifier solution.

To complete the conversion the mixture is then stirred for a further half hour.

The particulars are shown in the following tables 1 and 2.

The numerals denote parts by weight, this detail relating to solid substance in the case of the latices.

TABLE 1

|  | A | B | C | D | E | F | G | H | I | K | L | M |
|---|---|---|---|---|---|---|---|---|---|---|---|---|
| Baypren-Latex 4 R | 100 | 100 | 100 | 100 | 100 | 100 | 100 | 100 | 100 | 100 | 100 | 100 |
| Dinoram SL, 15% | 20.0 | 20.0 | 20.0 | 20.0 | 20.0 | — | 15.0 | 15.0 | 15.0 | 15.0 | 15.0 | — |
| Genamin, 10% | — | — | — | — | — | 30.0 | — | — | — | — | — | — |
| Zephirol, 10% | — | — | — | — | — | — | — | — | — | — | — | 20.00 |
| Tego betaine BL 158, 30% | 8.0 | — | — | — | — | — | — | — | — | — | — | — |

TABLE 1-continued

|   | A | B | C | D | E | F | G | H | I | K | L | M |
|---|---|---|---|---|---|---|---|---|---|---|---|---|
| Tego betaine L 7 30% | — | 8.0 | — | — | — | 8.0 | 7.0 | 7.0 | 7.0 | 7.0 | 7.0 | 15.0 |
| Tego betaine L 7 LS 30% | — | — | 8.0 | — | — | — | — | — | — | — | — | — |
| Aminoxide BL 163 30% | — | — | — | 8.0 | — | — | — | — | — | — | — | — |
| Aminoxide WS 35 30% | — | — | — | — | 8.0 | — | — | — | — | — | — | — |
| Acetic acid | 1.8 | 1.8 | 1.8 | 1.8 | 1.8 | 1.8 | — | — | — | — | — | — |
| Formic acid | — | — | — | — | — | — | 1.3 | — | — | — | — | — |
| Oxylic acid | — | — | — | — | — | — | — | 1.4 | — | — | — | — |
| Hydrochloric acid | — | — | — | — | — | — | — | — | 1.3 | — | — | — |
| Sulphuric acid | — | — | — | — | — | — | — | — | — | 0.7 | — | — |
| Phosphoric acid | — | — | — | — | — | — | — | — | — | — | 0.5 | — |
| Water | 15.2 | 15.2 | 15.2 | 15.2 | 15.2 | 25.2 | 25.2 | 25.2 | 25.2 | 27.5 | 29.8 | — |

TABLE 2

|   | N | O | P | Q | R | S | T | U | V |
|---|---|---|---|---|---|---|---|---|---|
| Baypren-Latex MKM | 100 | — | — | — | — | — | — | — | — |
| Neoprene-Latex 115 | — | 100 | — | — | — | — | — | — | — |
| Neoprene-Latex 101 | — | — | 100 | — | — | — | — | — | — |
| Neoprene-Latex 102 | — | — | — | 100 | — | — | — | — | — |
| Natural Latex | — | — | — | — | 100 | — | — | — | — |
| Perbunane-N-Latex 3415 M | — | — | — | — | — | 100 | — | — | — |
| Baystal S-latex 6680 | — | — | — | — | — | — | 100 | — | — |
| Baystal T-Latex 730 | — | — | — | — | — | — | — | 100 | — |
| Baystal S-Latex KA 8264 | — | — | — | — | — | — | — | — | 100 |
| Dinoram SL, 15% | — | 7.5 | 7.5 | 7.5 | 10.0 | — | 20.0 | 23.5 | 15.0 |
| Dehyquart C, 20% | 15.0 | — | — | — | — | — | — | — | — |
| Genamine 10% | — | — | — | — | — | 30.0 | — | — | — |
| Tego betaine L 7 | 6.0 | 4.5 | 4.0 | 4.0 | 7.0 | 10.0 | 15.0 | 5.0 | 7.0 |
| Acetic acid | — | 1.8 | 0.68 | 0.68 | 5.3 | 1.8 | 1.8 | 1.8 | — |
| Hydrochloric acid | — | — | — | — | — | — | — | — | 1.3 |
| Water | 15.2 | 5.7 | 5.7 | 5.7 | 27.4 | 25.2 | 20.2 | 17.0 | 25.2 |

The trade names in the foregoing tables have the following chemical meanings:

| | |
|---|---|
| Baypren-Latex MKM | anionic acidic CR Latex |
| Baypren-Latex 4 R | anionic acidic carboxylated CR Latex |
| Neoprene-Latex 115 | Non-ionic carboxylated CR Latex |
| Neoprene-Latex 101 | Non-ionic carboxylated CR Latex |
| Neoprene-Latex 102 | Non-ionic carboxylated CR Latex |
| Perbunan-N-Latex 3415 M | anionic acidic carboxylatic nitrile Latex |
| Baystal S-Latex 6680 | anionic alkaline carboxylated SBR Latex |
| Baystal T-Latex 730 | anionic alkaline SBR Latex |
| Baystal S Latex Ka 8264 | anionic acidic carboxylated Latex (mixed polymer from styrene, acrylonitrile, butadiene and methacrylic acid) |
| Dinoram SL | $R-NH-(CH_2)_3-NH_2$, R = Stearyl radical |
| Dehyquart C | Laurylpyridinium chloride |
| Genamin | Bis-(2-hydroxyethyl)-oleylamine |
| Zephirol | Benzyl-dodecyl-dimethylammonium chloride |
| Tego betaine BL 158 | $R-N^{\oplus}(CH_3)_2-CH_2COO^{\ominus}$ R = Cocinic alkyl radical |
| Tego betaine L 7 | Cocinicamidopropyl-betaine |

$$R-CONH-(CH_2)_3-\overset{\overset{CH_3^{\oplus}}{|}}{N}-CH_2COO^{\ominus}$$
$$|$$
$$CH_3$$

| | |
|---|---|
| Tego betaine L 7 LS | Cocinicamidopropyl-betaine, low-salt |
| Aminoxide BL 163 | $R-\overset{\overset{CH_3}{|}}{N}-O$ R = Cocinic alkyl radical, $CH_3$ |
| Aminoxide WS 35 | 1-alkoylamino-3-dimethylamino-propane-3-N—oxide |

$$C_7H_{15} \text{ to } C_{17}H_{35}-CONH-(CH_2)_3-\overset{\overset{CH_3}{|}}{N}-O$$
$$|$$
$$CH_3$$

IMPROVEMENT OF A CATIONIC BITUMEN EMULSION BY A CATIONIC LATEX ACCORDING TO EXAMPLES A-V

The cationic latex (pH value 1-6) is added to the cationic bitumen emulsion (pH value 1-6) with stirring. The differences in the pH value should not exceed 2 units as coagulation could otherwise occur. Any settlement occurring during storage, caused by differences in the density of the bitumen elmulsion and the density of the rubber latex, can be removed by stirring.

Comparison of an improved cationic, conventional commercial bitumen emulsion (I) also containing a non-ionic stabiliser and an improved cationic bitumen emulsion (II) addionally containing an amphoteric stabiliser according to examples A-V was carried out by the stone chipping test.

The stone chippings test is carried out in accordance with DIN No. 52 043, part 2:

180 g of Quartzite stone chippings having a grain size of 2/5 are placed in a pot. A mixute of 19 g of cationic bitumen emulsion, type U 60 K, and 1 g cationic latex (solids content about 55%) was added to it and the improved bitumen emulsion and the stone chippings are stirred vigorously with a rod until the emulsion breaks (after 40 to 60 seconds).

After a waiting time of 2 minutes, the mixture is washed twice with 600 cm³ of water in each case. The water issuing during the second washing treatment should be clear.

The stone chippings test allows assessment of the rate at which the improved bitumen emulsion breaks up, and allows assessment of the wetting of the stone chippings and adhesion to the stone chippings. Assessment is made visually (1=best mark, 6=worst mark).

|  | Test (I) | Test (II) |
| --- | --- | --- |
| Breaking Behaviour | 5 | 2 |

| -continued | | |
| --- | --- | --- |
|  | Test (I) | Test (II) |
| Wetting | 4 | 2 |
| Adhesion | 5–6 | 2–3 |

We claim:

1. A process for the production of an improved cationic latex by changing an anionic latex by means of a cationic emulsifier, comprising mixing the latex with an amphoteric emulsifier before addition of the cationic emulsifier.